United States Patent [19]
Malina et al.

[11] Patent Number: 4,724,712
[45] Date of Patent: Feb. 16, 1988

[54] GAS DRIVEN GYROSCOPE WITH EXTENDED RUNDOWN TIME

[75] Inventors: Meyer Malina, Cheshire; Abe Feldman, Derby, both of Conn.

[73] Assignee: Allied Corporation, Morris Township, Morris County, N.J.

[21] Appl. No.: 709,152

[22] Filed: Mar. 7, 1985

[51] Int. Cl.⁴ .................. G01C 19/12; G01C 19/26
[52] U.S. Cl. ............................................ 74/5.7; 74/5.12
[58] Field of Search ................................. 74/5.12, 5.7

[56] References Cited

U.S. PATENT DOCUMENTS

| | | | |
|---|---|---|---|
| 2,080,490 | 5/1937 | Kollsman | 74/5.7 X |
| 2,219,243 | 10/1940 | Kollsman | 74/5.7 |
| 2,729,106 | 1/1956 | Mathiesen | 74/5.7 |
| 3,263,507 | 8/1966 | Appleton | 74/5.7 |
| 3,393,569 | 7/1968 | Lief | 74/5.7 |
| 3,982,441 | 9/1976 | Widner | 74/5.12 X |
| 3,985,034 | 10/1976 | Widner | 74/5.12 X |
| 4,271,709 | 6/1981 | Feldman | 74/5.12 |

Primary Examiner—Rodney H. Bonck
Attorney, Agent, or Firm—Stanley N. Protigal; Howard G. Massung

[57] ABSTRACT

A gas gyroscope 11 is provided with an aspirator pump 71 in order to evacuate gas from the main chamber 19 of the gyroscope 11. The evacuation of gas reduces windage and other air friction encountered by the gyroscope's rotor 21 and thereby extends the rundown time of the gyroscope. The aspirator 71 may be energized by a dedicated compressed gas source such as a compressed gas chamber 91. Alternatively, the aspirator 71 may be provided with ram air or bleed perpellant gases.

23 Claims, 5 Drawing Figures

GAS DRIVEN GYROSCOPE WITH EXTENDED RUNDOWN TIME

BACKGROUND OF THE INVENTION

This invention relates to a gas driven gyroscope (gyro) with an integrally contained gas source. More particularly it relates to improvements in gas driven gyroscopes which reduce internal friction in order to extend the rundown time or maintain higher speeds of the rotor during a specified time.

Gas driven gyroscopes with integrally contained gas sources are known which have a gas driven reaction rotor in one chamber and compressed inert gas in another chamber. Gas is released from one chamber by means such as puncturing a thin wall between the chambers. The gas, when released, flows through the hollow bore of the rotor shaft and outwardly through reaction passages in the rotor to cause it to spin. Changes in the gas pressure may also be used to uncage the gyroscope gimbals after the rotor is spinning. Such gyroscopes are sometimes called pyrotechnic gyros because pyrotechnic techniques are frequently used to puncture the wall.

An example of the foregoing type of gas driven gyroscope is detailed in U.S. Pat. No. 3,393,569, issued July 23, 1968, now assigned to the present assignee. The U.S. Pat. No. 3,393,569 is incorporated herein by reference and any of the various species of gas driven gyros shown in that patent might employ the improvement of the present invention.

One advantage of a gas driven gyro, as compared to a spring driven gyro, is that the gas driven gyro has a high ratio of usable energy in relation to its volume and weight. The potential energy in the compressed gas is quickly translated to rotational kinetic energy of the spinning rotor. The "rundown" of the rotor refers to the gradual decrease in rotor speed over time after the gas is expelled through the rotor passages. Various loss factors affect the rundown of such gyros. The most significant of these factors relates to energy absorbed by the gyro's interaction with that gas which remains in the gyroscope after gas release is completed. This invention is directed to the reduction of such air friction losses.

One such air friction loss is caused by the reaction rotor acting as a pump rather than as a reaction turbine and acting to suck gas through the end of the shaft to pump it out the rotor exhaust ports. This reduces kinetic energy and causes more rapid slowing of the rotor. This problem is specifically addressed by U.S. Pat. No. 4,271,709, issued Jan. 9, 1981, now assigned to the present assignee and incorporated herein by reference. That patent discloses a poppet valve which prevents such pump action. The prevention of such pumping, of course, does not eliminate other air friction losses from the gyroscope which is spinning at high speeds, preferably in excess of 30,000 RPM.

Accordingly, one object of the present invention is to improve gyroscope performance. It is therefore an object to provide an improved gas driven gyroscope with an extended rundown time, or having a higher average speed during a specified rundown time. Another object of the invention is to provide an improved gas driven gyroscope with reduced losses during rundown. Another object of the invention is to provide a gas driven gyroscope in which running friction is reduced during rundown. It is a further object to provide the gyroscope in which air is provided to the gyroscope in order to provide kinetic energy for the gyroscope rotor, and the air is evacuated from the gyroscope after initial run-up in order to extend rundown time of the gyroscope particularly at high rotor speeds. It is therefore an object to reduce air friction in a gas driven gyro.

SUMMARY OF THE INVENTION

In accordance with the present invention, air friction acting on a gas driven gyroscope rotor is reduced in order to extend the rundown time of the gyroscope. The gas is preferably vented during a time in which working gas is admitted to the chamber. After the venting, the chamber is essentially sealed and an aspirator evacuates remaining gas from the chamber. This evacuation of the chamber reduces air friction during rundown. The aspirator may be powered by gas from propulsion of the vehicle carrying the gyroscope, by ram air from the forward motion of the vehicle or from a compressed gas chamber. Alternatively, the aspirator may be powered by electrical or mechanical means.

DESCRIPTION OF THE PREFERRED EMBODIMENTS

Figure 1:
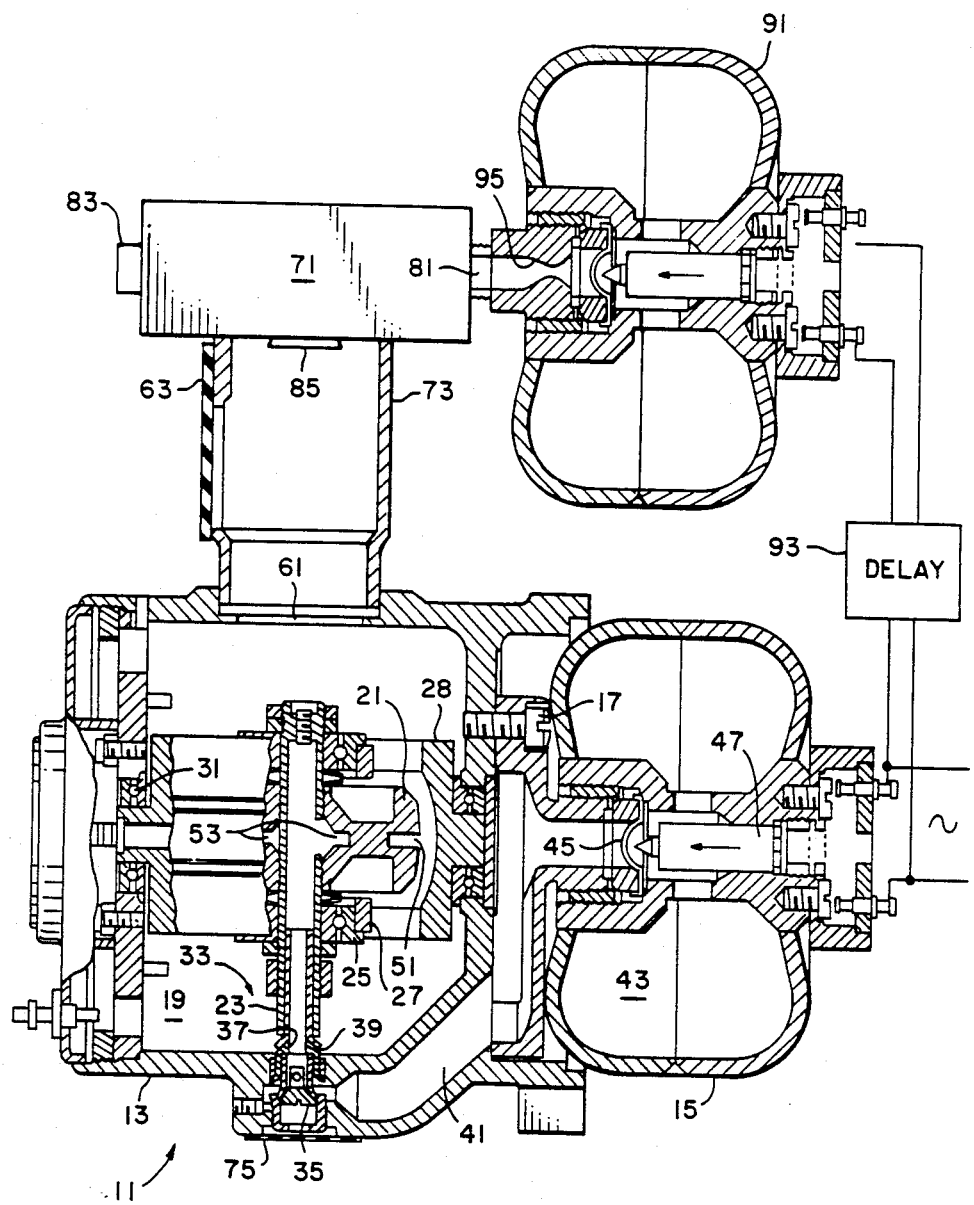
FIG. 1 is a cross-sectional view of a gas driven gyroscope constructed in accordance with one embodiment of the invention, in which compressed gas is used to operate an aspirator in order to evacuate a rotor chamber.

Referring to FIG. 1 of drawings, a gas gyroscope 11 includes a main housing 13 and a compressed gas housing section 15 attached thereto by bolts 17. The main housing 13 defines a chamber 19 enclosing a gas reaction rotor 21 mounted on a hollow rotor shaft 23. The shaft 23 is mounted in precision high speed bearings 25 supported by an inner gimbal 27. The inner gimbal 27 is rotatably supported in an outer gimbal 28 which, in turn, is supported in bearings 31 in housing 13.

The rotor 21 and gimbals 27, 28 are "caged" prior to release of a gas by means of a caging mechanism shown generally at 33. Details of the operation of the caging mechanism 33 may be had by reference the aforesaid U.S. Pat. No. 3,393,569. It should suffice to note that the caging mechanism 33 includes a piston 35 which is initially released and positioned by gas pressure and then caused to hold a caging plug 37 upward against a beveled portion 39 of the rotor shaft 23. When a gas pressure differential across the piston falls to a predetermined value, the caging plug 37 is withdrawn and the rotor 21 and gimbals 27, 28 are uncaged. The caging mechanism 33 also serves as a conduit to conduct compressed gas from an intermediate passage 41 to the hollow rotor shaft 23. However when the caging plug 33 is withdrawn, the conduit is disconnected from the rotor shaft 23, which now has free access to the interior of housing 13.

The compressed gas housing 15 defines a compressed gas chamber 43 which communicates with the hollow rotor shaft 23 via the caging mechanism and the intermediate connecting passage 41 when a thin disc 45 is punctured in a known manner by an electrically operated pyrotechnic propelled piston 47. The operation of the puncturing mechanism which operates to release compressed inert gas from the compressed gas housing 15 into passage 41 is immaterial to the present invention, but details of several suitable types of mechanisms may be found by reference to the aforesaid U.S. Pat. No. 3,393,569.

The rotor 21 includes a plurality of circumferentially spaced nozzles 51 and the shaft 23 also includes a plurality of circumferentially spaced gas admission ports 53 freely communicating with nozzles 51.

In operation, an inert gas, preferably nitrogen, at 3000 pounds per square inch is contained in the compressed gas housing 15 and is communicated via passage 41 and caging mechanism 33 to the interior of shaft 23 and thence to rotor nozzles 51 via ports 53. This causes the rotor 21 to spin at a high speed, preferably 36,000-50,000 R.P.M. depending upon the size of the gas chamber and the particular use to which the gyroscope 11 is put. When the gas pressure within the main housing chamber 19 falls to a predetermined value, the caging mechanism 33 releases the rotor and gimbals, also disconnecting the conduit leading to the intermediate connecting passage 41.

Gas escaping from the rotor nozzles 51 is received within the main housing chamber 19. In order to avoid a significant build-up of air pressure within the main chamber housing 19, this air is permitted to escape through an exhaust port 61 and a flapper valve 63. Where the rotor 21 is uncaged by the caging mechanism 33, gas in the compressed chamber 43 is depleted.

In accordance with the present invention, gas from the main housing chamber 19 is then further evacuated by an evacuation pumping means such as an aspirator 71. The purpose of further evacuating gas from the main housing chamber 19 is to reduce windage gas friction which would result from the rapid rotational speed of the rotor 21.

The aspirator 71 is selected to provide a vacuum sufficient to reduce air friction for the duration of time that extended run down is called for. A significant criteria is the amount of compressed gas which must be consumed to operate the aspirator. A preferred vacuum aspirator 71 for use in the embodiment of FIG. 1 is model AVR-093H Vacuum Transducer Pump, manufactured by Air-Vac Engineering Co. of 100 Gulf St., Milford, Conn., U.S.A.

Flapper valve 63 communicates with an exhaust conduit 73. Flapper valve 63 is fixed to the exhaust conduit 73 and functions as a check valve in order to permit gas to escape from the exhaust conduit 73 while preventing gas from reentering the exhaust conduit 73. Thus, when the aspirator 71 is able to draw a vacuum from the main housing chamber 19 through the exhaust conduit 73, flapper valve 63 is closed. When gas from the compressed gas housing 15 is provided at a volume which exceeds the capability of the aspirator 71 to extract the gas from the main housing chamber 19, flapper valve 63 opens. Likewise, a second flapper valve 75, associated with the caging mechanism 33, opens to enable the piston 35 to operate the caging mechanism 33, and closes when pressure within chamber 19 drops.

The aspirator 71 is of conventional design and converts compressed air to vacuum by using venturi (Bernoulli's Law) principles. Compressed gas enters the aspirator 71 through a compressed gas inlet port 81 and is exhausted through a gas outlet port 83. This flow of gas causes a vacuum to be created at a vacuum inlet port 85, and gas to flow through the aspirator 71 from the vacuum inlet port 85 to the outlet port 83.

As shown in FIG. 1, the compressed gas source for the compressed gas inlet port 81 may be an additional compressed gas housing 91. The additional compressed gas housing 91 is caused to release a compressed gas charge a short time after gas is initially released from compressed gas housing 15. This may be accomplished by a simple delay circuit 93. A restrictor valve 95 may be used to control the flow of air from the additional compressed gas housing 91 to the compressed gas inlet port 81. Alternatively, the compressed gas source may be a pyrotechnic device (not shown).

Figure 2:
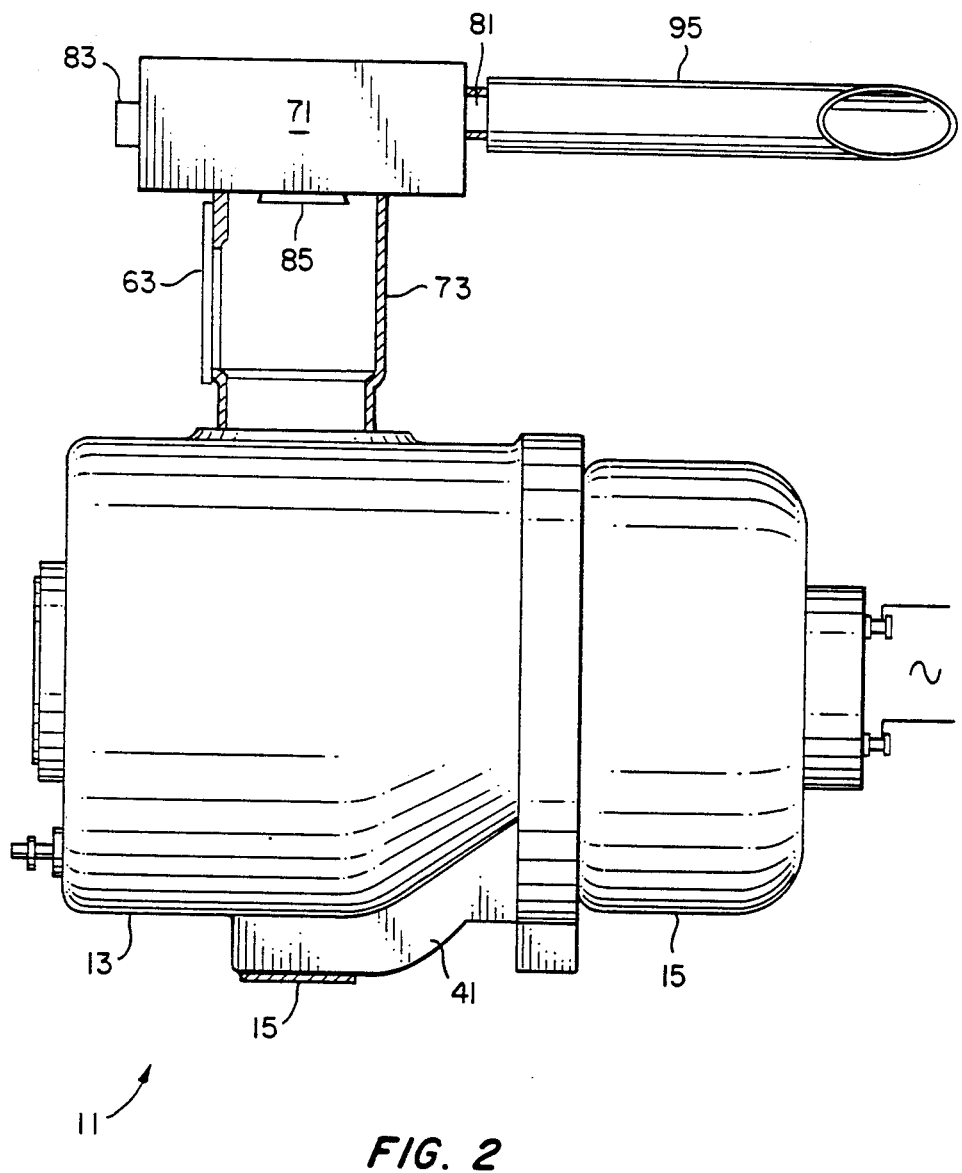
FIG. 2 is a schematic diagram of an alternate embodiment of the invention, in which an external compressed gas source such as ram air is used to accomplish such evacuation.
Figure 3:
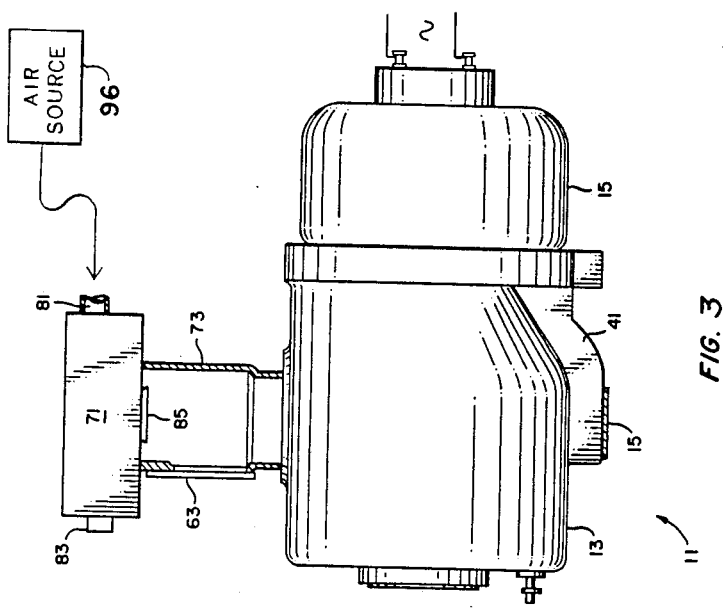
FIG. 3 schematically shows the use of an alternate external air source to cooperate the aspirator.

Referring to FIGS. 2 and 3, the compressed gas inlet port 81 may be connected to an external compressed air source 95. The external compressed air source 95 may be a ram air source which provides compressed air to operate the aspirator 71 as a result of motion of a vehicle such as a missle (not shown) into which the gyroscope 11 is mounted. Alternatively, an external compressed air source 96 may be pressurized propellant gas from the vehicle's propulsion source.

Figure 4:
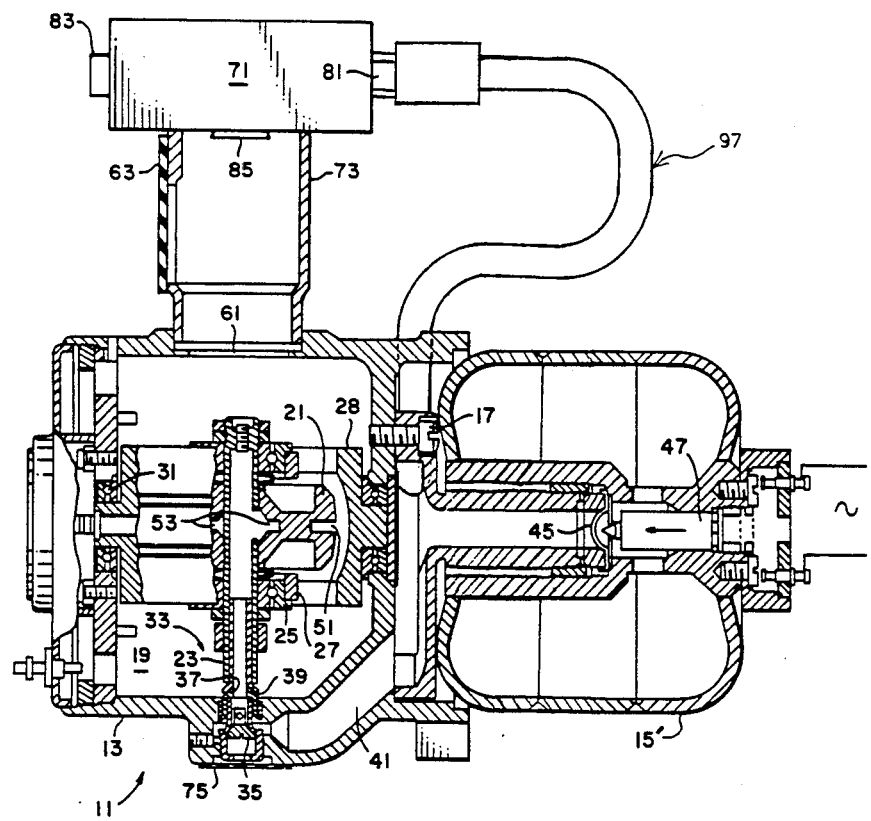
FIG. 4 shows a common compressed gas soure used to supply energy to the gyroscope rotor and to operate the aspirator.

As shown in FIG. 4, it is further possible to use some of the compressed gas from a compressed gas housing 15' in order to operate the aspirator 71. This would be accomplished by use of an appropriate diverter circuit 97 which would divert gas from the piston 35 to the compressed gas inlet port 81.

In order to extend operating time, it is possible to use a combination of a compressed gas housing and an external compressed gas source to operate the aspirator pump 71. This can be accomplished by valving the aspirator 71 at the compressed gas inlet port 81 so that when compressed gas to operate the aspirator 71 is depleted, the external compressed gas source can provide gas to operate the aspirator 71. This is particularly useful where ram air may not be available at initial launch of a missile.

In order to determine the feasibility of using compressed gas to operate the aspirator 71, an aspirator was used to maintain a vacuum from a 52 cm$^2$ container for 2 seconds. The aspirator drew a vacuum of 0.7 atm (28 in. Hg). The exhaust gas from the aspirator was captured in a rubber balloon and was found to be approximately half the volume of the container, or approximately 25 cm$^2$. From this it was determined that the use of compressed gas to maintain a gyroscope of like volume at a vacuum in a working environment is practical.

Figure 5:
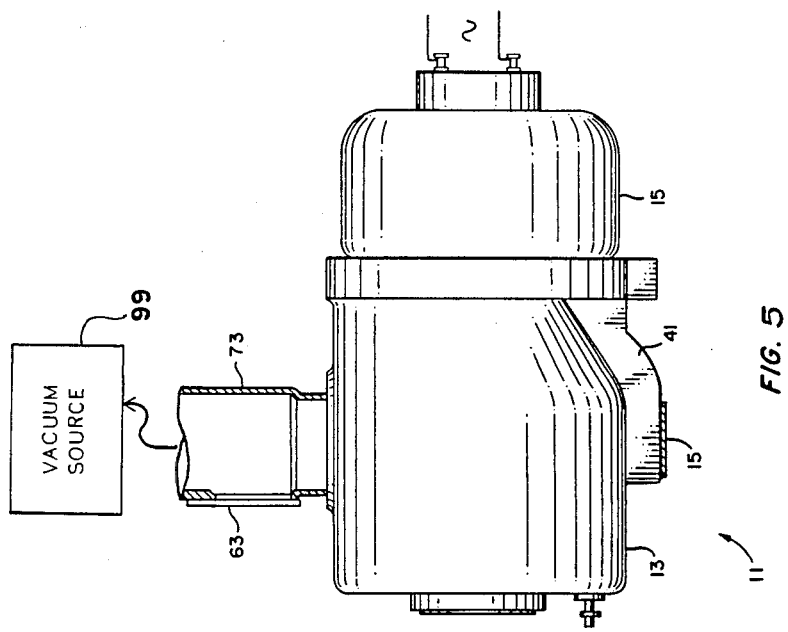
FIG. 5 schematically shows an alternate vacuum source to evacuate the rotor chamber.

As shown in FIG. 5, it is possible to substitute other vacuum sources 99 for aspirator 71. For example, bleed vacuum from a vehicle propulsion system may be used. Mechanically or electrically driven suction pumps may also be used.

The above description of the preferred embodiments is given by way of example only, as it is anticipated that modifications of the preferred embodiment may prove to be economically feasible. Accordingly, the invention should be read as limited only by the appending claims.

What we claim is:

1. Gas operated gyroscope of a type having a gas source from which gas is expelled for a period of time in order to provide kinetic energy to a rotor gimballed within a rotor chamber, and after said period of time the rotor is operated in a run drown mode of operation, characterized by:
   an aspirator pump in communication with said rotor chamber, said aspirator pump producing a negative pressure level to draw a vacuum within said rotor chamber during said run down mode of operation.

2. Gas operated gyroscope as described in claim 1, further characterized by:
   the gryoscope being operated in said run down mode without kinetic energy being supplied to the rotor.

3. Gas operated gyroscope as described in claim 1 further characterized by:
   the aspirator pump being a venturi-type pump which utilizes compressed gas in order to produce said negative pressure level.

4. Gas operated gyroscope as described in claim 3 further characterized by:
   said gas source providing energy to the rotor including a gas chamber containing compressed gas and a first pyrotechnic device which releases said compressed gas,
   a first electrical signal being provided to the first pyrotechnic device and the first pyrotechnic device responding to said electrical signal in order to expel said gas; and
   the compressed gas provided to the aspirator pump being provided by an additional gas chamber containing compressed gas which is released by an additional pyrotechnic device.

5. Gas operated gyroscope as described in claim 4 further characterized by:
   the gyroscope being mounted in a vehicle; and
   the compressed gas being provided to the aspirator pump by ram air obtained from forward motion after gas from the additional gas chamber has been used to provide the compressed gas to the aspirator pump.

6. Gas operated gyroscope as described in claim 3 further characterized by:
   said gas source providing energy to the rotor including a gas chamber containing compressed gas and a pyrotechnic device which releases said compressed gas; and
   a first electrical signal being provided to the pyrotechnic device and the pyrotechic device responding to said electrical signal in order to expel said gas; and
   the compressed gas provided to the aspirator pump is provided by said gas chamber.

7. Gas operated gyroscope as described in claim 6 further characterized by:
   the gyroscope being mounted in a vehicle; and
   the compressed gas being provided to the aspirator pump by ram air obtained from forward motion after gas from said gas chamber has been used to provide the compressed gas to the aspirator pump.

8. Gas operated gyroscope as described in claim 3 further characterized by:
   the gyroscope being mounted in a vehicle; and
   the compressed gas being provided by ram air obtained from forward motion of the vehicle.

9. Gas operated gyroscope as described in claim 3 further characterized by:
   the gyroscope being mounted in a vehicle having a propulsion system; and
   the compressed gas being provided by bleed propellant gas from a propulsion system on the vehicle.

10. Gas operated gyroscope as described in claim 3 further characterized by:
    the compressed gas being obtained from a pyrotechnic device.

11. Gas operated gyroscope as described in claim 1 further characterized by:
    the gyroscope being mounted in a vehicle having a propulsion system; and
    the aspirator pump being the vehicle propulsion system.

12. Gas operated gyroscope of a type having a gas source from which gas is expelled for a period of time in order to provide kinetic energy to a rotor gimballed within a rotor chamber, and after said period of time the rotor is operated in a run down mode of operation, characterized by:
    (a) an aspirator pump in communication with said rotor chamber, said aspirator pump producing a negative pressure level to draw a vacuum within said rotor chamber, and
    (b) an exterior exhaust valve which opens to release said expelled gas to outside of said rotor chamber, said valve being closed when said expelled gas is substantially at ambient pressure to thereby allow said aspirator pump to be bypassed when said exterior valve is opened and allow the aspirator pump to draw said vacuum when said exterior exhaust valve is closed.

13. Gas operated gyroscope as described in claim 12, further characterized by:
    the gyroscope being operated in said run down mode without kinetic energy being supplied to the rotor.

14. Gas operated gyroscope as described in claim 12 further characterized by:
    the aspirator pump being a venturi-type pump which utilizes compressed gas in order to produce said negative pressure level.

15. Gas operated gyroscope as described in claim 14 further characterized by:
    said gas source providing energy to the rotor including a gas chamber containing compressed gas and a first pyrotechnic device which releases said compressed gas,
    a first electrical signal being provided to the first pyrotechnical device and the first pyrotechnic device responding to said electrical signal in order to expel said gas; and
    the compressed gas provided to the aspirator pump being provided by an additional gas chamber containing compressed gas which is released by an additional pyrotechnic device.

16. Gas operated gyroscope as described in claim 15 further characterized by:
    a time delay circuit which provides an electrical signal to said additional pyrotechnical device at a time after the first electrical signal is provided to the first pyrotechnical device.

17. Gas operated gyroscope as descfribed in claim 15 further characterized by:
    the gyroscope being mounting in a vehicle; and
    the compressed gas being provided to the aspirator pump by ram air obtained from forward motion after the compressed gas has been exhausted.

18. Gas operated gyroscope as described in claim 14 further characterized by:

said gas source providing energy to the rotor including a gas chamber containing compressed gas and a pyrotechnic device which releases said compressed gas; and a first electrical signal being provided to the pyrotechnic device an the pyrotechnic device responding to said electrical signal in order to expel said gas; and the compressed gas provided to the aspirator pump is provided by said gas chamber.

19. Gas operated gyroscope as described in claim 18 further characterized by:

the gyroscope being mounted in a vehicle; and the compressed gas being provided to the aspirator pump by ram air obtained from forward motion after gas from said gas chamber has been used to provide the compressed gas to the aspirator pump.

20. Gas operated gyroscope as described in claim 14 further characterized by:

the gyroscope being mounted in a vehicle; and the compressed gas being provided by ram air obtained from forward motion of the vehicle.

21. Gas operated gyroscope of a type having a gas source from which gas is expelled for a period of time in order to provide kinetic energy to a rotor gimballed within a rotor chamber, and after said period of time the rotor is operated in a run down mode of operation, characterized by:

(a) an aspirator pump in communication with said rotor chamber, said aspirator pump producing a negative pressure level to draw a vacuum within said rotor chamber, and (b) an exterior exhaust valve which opens to release said expelled gas to outside of said rotor chamber, said valve being closed when said expelled gas is substantially at ambient pressure to thereby allow said aspirator pump to be bypassed when said exterior exhaust valve is closed;

(c) the aspirator pump being a venturi-type pump which utilized compressed gas in order to produce said negative pressure level;

(d) said gas source providing energy to the rotor including a gas chamber containing compressed gas and a first pyrotechnic device which releases said compressed gas;

(e) a first electrical signal being provided to the first pyrotechnic device and the first pyrotechnic device responding to said electrical signal in order to expel said gas;

(f) the compressed gas provided to the aspirator pump being provided by an additional gas chamber containing compressed gas which is released by an additional pyrotechnic device; and (g) a time delay circuit which provides an electrical signal to said additional pyrotechnic device at a time after the first electrical signal is provided to the first pyrotechnic device.

22. Gas operated gyroscope as described in claim 21, further characterized by:

the gyroscope being operated in said run down mode without kinetic energy being supplied to the rotor.

23. Gas operated gyroscope as described in claim 21 further characterized by:

the gyroscopoe being mounted in a vehicle; and the compressed gas being provided to the aspirator pump by ram air obtained from forward motion after the compressed gas has been exhausted.

* * * * *